United States Patent
Habetler

(10) Patent No.: US 6,822,839 B2
(45) Date of Patent: Nov. 23, 2004

(54) METHOD AND APPARATUS OF DETECTING INTERNAL MOTOR FAULTS IN AN INDUCTION MACHINE

(75) Inventor: Thomas G. Habetler, Snellville, GA (US)

(73) Assignee: Eaton Corporation, Cleveland, OH (US)

( * ) Notice: Subject to any disclaimer, the term of this patent is extended or adjusted under 35 U.S.C. 154(b) by 42 days.

(21) Appl. No.: 10/065,975

(22) Filed: Dec. 5, 2002

(65) Prior Publication Data
US 2004/0109267 A1 Jun. 10, 2004

(51) Int. Cl.[7] .............................................. H02H 5/04
(52) U.S. Cl. ........................................ 361/30; 324/772
(58) Field of Search ............................. 361/23, 30, 31, 361/33; 318/727, 767, 798–800, 805, 806, 807, 490; 324/511, 522, 772, 76.19, 76.21; 702/58, 60, 64, 65

(56) References Cited

U.S. PATENT DOCUMENTS

| | | |
|---|---|---|
| 4,581,711 A | 4/1986 | Hirata et al. |
| 5,270,640 A | 12/1993 | Kohler et al. |
| 5,430,438 A | 7/1995 | Joos et al. |
| 5,519,300 A * | 5/1996 | Leon et al. ................. 318/729 |
| 5,521,482 A * | 5/1996 | Lang et al. ................. 318/800 |
| 5,523,701 A | 6/1996 | Smith et al. |
| 5,570,256 A | 10/1996 | Schoen et al. |
| 5,586,043 A | 12/1996 | Breen et al. |
| 5,644,458 A | 7/1997 | Schoen et al. |
| 5,742,522 A | 4/1998 | Yazici et al. |

* cited by examiner

*Primary Examiner*—Ronald Leja
(74) *Attorney, Agent, or Firm*—Ziolkowski Patent Solutions Group, LLC

(57) ABSTRACT

The present invention is directed to a condition monitoring system for determining internal motor fault information. Voltage and current data are acquired from an induction machine in operation. Reactive and real power delivered to the induction machine is then determined from the voltage and current data. An inspection of the frequency spectrum of the real power as well as the reactive power is then used to ascertain load and motor condition. Specifically, an analysis of the frequency spectrum of the reactive power may be inspected for information relating to an internal motor fault whereas the frequency spectrum of the real power may be inspected for information relating to motor-driven or load faults.

23 Claims, 2 Drawing Sheets

METHOD AND APPARATUS OF DETECTING INTERNAL MOTOR FAULTS IN AN INDUCTION MACHINE

BACKGROUND OF INVENTION

The present invention relates generally to induction machine monitoring and, more particularly, to a method and apparatus for determining motor fault information in an induction machine.

Electric motors, such as three-phase AC induction motors, are used in a variety of commercial and industrial environments. Refrigeration systems, printing presses, assembly lines, and a myriad of other applications use such motors. Regardless of the application, timely detection of a motor fault is of the utmost importance. Generally, a motor fault is not detected until complete breakdown of the electric motor, thereby, creating a situation marred with undue cost, downtime delay and repairs, as well as, potential hazardous conditions. As a result, it is necessary to efficiently and effectively detect a motor fault.

It is desirable to determine when an induction machine such as a motor or generator is experiencing a mechanical or electrical problem before total failure occurs. A number of problems can lead to breakdown or premature failure of an induction machine. For example, electrical unbalances, misalignment, air gaps, and rotor unbalance can lead to improper operation of the induction machine. Other problems can arise as a result of a defect that is internal to the machine such as bearing failure, material and structural flaws introduced to the machine during manufacturing, and overheating.

Typical motor monitoring systems monitor the real power to an induction machine as an indicator of health/condition of the motor and its driven load. However, the real power delivered to an induction machine or motor depends on outside factors or considerations outside of the motor itself. Inspection of the real power delivered to the induction machine is often done to determine fault conditions attributable to the load on the machine as well as the machine itself. For example, monitoring of the frequency spectrum of real power of the induction machine for unexpected harmonics or disturbances to expected harmonics would provide fault information associated with a combination of the load and the motor. However, harmonics in the frequency spectrum of real power is believed a better indicator of load faults than internal motor faults. As such, it is difficult to discern faults attributable to the motor itself versus those faults attributed to the load or motor driven.

Accordingly, a number of methods have been developed to distinguish between an internal motor fault and a fault attributable to the load of the machine. One such method utilizes values of currents and voltages in the three phases of an induction machine to estimate current which is not substantially affected by load torque effects of the machine. This method compares an estimated current value with an actual current value to determine if a fault is present. As such, it is necessary to model operation of the induction machine, or alternatively, generate a set of baseline values that are common to more than one induction machine. However, generating baseline values that are not particular to a given machine fails to take into account the nuances in operation of each machine which can lead to improper or false detection of fault conditions. Additionally, this method requires the calculation of flux linkage in the motor which increases the complexity as well as cost of the condition monitoring system.

It would therefore be desirable to design a more efficient system to discern an internal motor fault in an induction machine.

BRIEF DESCRIPTION OF INVENTION

The present invention is directed to a condition monitoring system for determining an internal motor fault in an induction machine overcoming the aforementioned drawbacks. In accordance therewith, voltage and current data are acquired from an induction machine in operation. From the voltage and current data, "d" and "q" axis voltages and "d" and "q" currents are calculated. The axis voltages and currents then undergo a reference frame transformation. From the transformed voltage and current values, instantaneous reactive and instantaneous real power delivered to the induction machine is determined. An inspection of the frequency spectrum of the instantaneous real power as well as the instantaneous reactive power is then used to ascertain load and motor fault information. Specifically, an analysis of the frequency spectrum of the instantaneous reactive power provides an indication of an internal motor fault whereas the frequency spectrum of the instantaneous real power would provide an indication of motor-driven or load faults.

Therefore, in accordance with one aspect of the present invention, a method of identifying load and motor fault information in a condition monitoring system is provided. The method includes the step of simultaneously sampling voltage and current data of an induction machine in operation. An indicator of reactive power is then determined from a portion of the sample voltage and current data. The method further includes the step of determining an internal motor fault using the indicator of reactive power.

In accordance with another aspect of the present invention, an induction motor monitoring system includes at least one voltage sensor and at least one current sensor as well as a controller connected to the at least one voltage and the at least one current sensors. The controller is configured to receive voltage and current data from the at least one voltage and at least one current sensor and determine instantaneous reactive power from the voltage and current data. The controller is further configured to generate a frequency spectrum for the instantaneous reactive power and determine a motor fault from at least the frequency spectrum.

In accordance with yet a further aspect of the present invention, an apparatus to distinguish between a motor fault and a load fault in an AC induction motor is provided. The apparatus includes at least two current sensors for obtaining at least two AC motor current signals and at least two voltage sensors for obtaining at least two AC motor voltage signals. An analog-to-digital converter is provided for converting the at least two AC motor signals to digitized current signals and the at least two AC motor voltage signals to digitized voltage signals. The apparatus further includes a microprocessor to receive the digitized signals and compare instantaneous reactive power values to a set of baseline reactive power values to determine a motor fault in the motor.

The present invention may be implemented with either hardware and/or software. As such, in another aspect of the invention, a computer readable storage medium having a computer program stored thereon is used to determine faults in an AC induction motor. The computer program represents a set of instructions that when executed by a computer causes the computer to monitor operation of an AC motor having a load thereon and known to be operating normally.

The computer is then caused to determine baseline operation from the modeling. The set of instructions further causes the computer to acquire real-time voltage and real-time current data of the AC motor in operation and determine reactive power of the AC motor from the real-time voltage and real-time current data. The computer is then caused to compare the reactive power to the baseline operation and determine therefrom the presence of fault conditions in the AC motor.

In accordance with another aspect of the present invention, a motor fault detector for an AC induction motor includes means for acquiring voltage and current data of an AC motor in operation. The detector further includes means for determining instantaneous reactive power from the AC motor from the voltage and current data. Means for determining an internal fault in the AC motor from the instantaneous reactive power is also provided.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
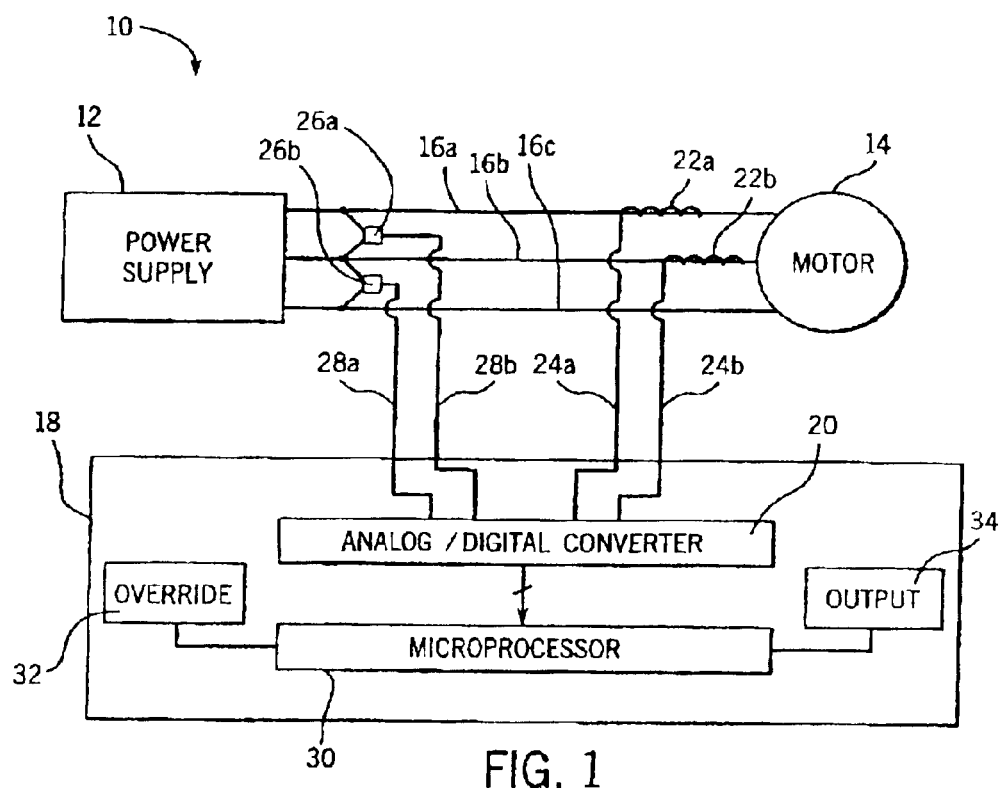
FIG. 1 is a schematic drawing of an induction machine monitoring system in accordance with the present invention.

The operating environment of the present invention will be described with respect to a three-phase AC induction electric motor as shown in FIG. 1. However, it will be appreciated that the present invention is equivalently applicable for use with single-phase or other poly-phase AC motors as well as other types of electric motors.

Figure 2:
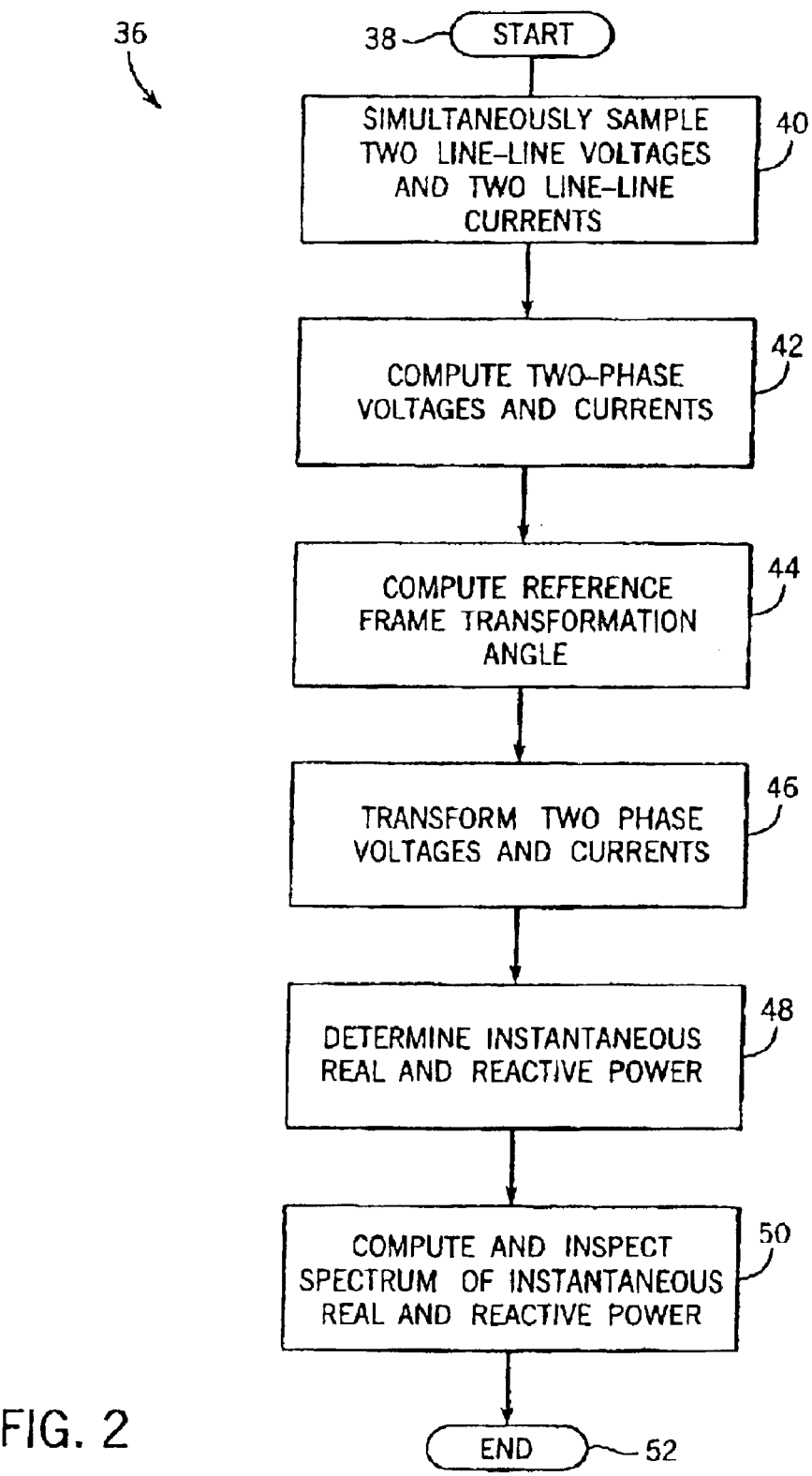
FIG. 2 is a block diagram of a fault detection scheme used with the induction machine monitoring system shown in FIG. 1.

A motor fault detector incorporating a fault detection scheme in accordance with the present invention is illustrated in FIGS. 1–2. With reference to FIG. 1, a motor fault detection system 10 includes a power supply 12 connected to an electric motor 14 via transmission lines 16a, 16b, and 16c. The system 10 further includes a general purpose computer 18 having an analog-to-digital converter (A/D converter) 20 to monitor current and voltage being transmitted to the electric motor 14 across transmissions lines 16a–16c. Current sensors or transducers 22a and 22b obtain waveforms of current traveling to the motor 14 and transmit waveform representations to the A/D converter 20 via transmission lines 24a, 24b. Voltage sensors or transducers 26a and 26b obtain waveform representations of the voltage supplied to the motor 14 and transmit the waveform representations to the A/D converter 20 through transmission lines 28a, 28b. The A/D converter 20 receives the current and voltage waveform representations and digitizes each waveform so that measurements of the waveforms can be readily obtained. The computer 18 has microprocessor 30 that receives the digitized signals from the A/D converter 20 and executes a computer program that will cause the microprocessor 30 to analyze the digitized signals, as will be discussed in reference to FIG. 2.

Computer 18 includes an override terminal connected to microprocessor 30 that when activated allows a user of the AC induction motor 14 to override the output of the microprocessor 30. Such an override may be useful to delay a shutdown and crucial applications where the process must continue regardless of a motor fault. The microprocessor 30 outputs data to the user of the motor 14 through an output terminal 34.

As will be described in greater detail with respect to FIG. 2, the present invention utilizes a transformation generally referred to as a reference frame transformation that is generally known in the art. Reference frame transformation is a technique for transforming digital data that, unlike a fast Fourier transform (FFT), allows for continuous transformation of data. Unlike the reference frame transformation, several cycles of data collection are required before an FFT can be performed upon the digitized data before a usable result is obtained. While the present invention will be described with respect to the implementation of a reference frame transformation, an FFT may also be equivalently implemented.

Referring now to FIG. 2, a process 36 for separating motor and driven load faults in an AC induction motor is shown. Process 36 may be implemented with hardware, software, or any combination thereof. As such, the steps of process 36, which will be described below, are equivalently the acts of a computer program for a software implementation or the function of a specific hardware implementation. Process 36 begins at 38, with the acquisition of two line-line voltages and two line-line currents from a loaded AC induction motor in operation at 40. From the two line-line voltages and currents, two-phase voltage and two-phase current data is computed at 42. The algorithms for determining two-phase voltages and two-phase currents are generally known and the equations used are set forth below. Specifically, the q-axis voltage may be defined as follows:

$$v_q = (2/3)v_{ab} + (1/3)v_{bc} \quad \text{(Eqn. 1)},$$

wherein $v_{ab}$ is one line-to-line voltage and $v_{bc}$ is another line-to-line voltage.

The d-axis voltage is defined by:

$$v_d = -[1/sqrt(3)]v_{bc} \quad \text{(Eqn. 2)}.$$

The q-axis current is generally referenced as the current value of one line current. As such, the q-axis current may be defined as:

$$i_q = i_a \quad \text{(Eqn. 3)},$$

where $i_a$ equals one line-to-line current.

The d-axis current may be defined by:

$$i_d = -[1/sqrt(3)](i_a + 2i_b) \quad \text{(Eqn. 4)},$$

where $i_b$ is the other line-to-line current value.

As indicated previously, in the preferred embodiment, a reference frame transformation is used. As such, a reference frame transformation angle is determined at 44. The transformation angle is a function of the q-axis voltage and the d-axis voltage, and may be defined by the following equation:

$$\theta = \tan^{-1}(-v_d/v\_) \quad \text{(Eqn. 5)}.$$

Once the reference frame transformation angle is determined at 44, the current and voltage values are transformed to a rotating reference. The reference frame current and voltage values may be found according to the following equations:

$$v_{q\_es} = v_q \cos\theta + v_d \sin\theta \quad \text{(Eqn. 6)};$$

$$i_{q\_es} = i_q \cos\theta + i_d \sin\theta \quad \text{(Eqn. 7)};$$

$$i_{d\_es} = i_q \sin\theta - i_d \cos\theta \quad \text{(Eqn. 8)}.$$

Since power may be defined by the product of voltage and current, the present invention includes the computation of instantaneous real and instantaneous reactive power at 48. Instantaneous real power may be defined by:

$$p = v_{q\_es} i_{q\_es} \quad \text{(Eqn. 9)},$$

and instantaneous reactive power may be defined by:

$$q = v_{q\_es} i_{d\_es} \quad \text{(Eqn. 10)}.$$

The instantaneous real power may be analyzed to determine a motor-driven or load fault, whereas the instantaneous reactive power may be analyzed to ascertain the presence of faults internal to the motor.

To differentiate and distinguish between motor-driven faults and internal motor faults, the frequency spectrum of the instantaneous real power, as well as the frequency spectrum of the instantaneous reactive power, are determined at 50 as an indication of load and motor condition, respectively. As such, the frequency spectrum of the instantaneous reactive power can be used to indicate overall well-being of the motor while the frequency spectrum of the instantaneous real power may be used as an indication of the torque being delivered to the load as well as the motor condition. Therefore, to ascertain the motor condition, an inspection of the frequency spectrum of the instantaneous reactive power is preferred. In analyzing the frequency spectrum, an inspection is made to determine unexpected harmonics or variations in expected harmonics. Of particular interest are the harmonics related to the rotating speed of the machine. However, other harmonics may be examined to ascertain fault information.

For both the instantaneous real power and the instantaneous reactive power, thresholds may be established such that a controller or computer automatically shuts down the induction machine if the instantaneous values exceed the threshold values. Cautionary or warning indicators such as audio/visual alarms may also be implemented rather than automatically shutting down the induction machine if the thresholds are exceeded. Additionally, the present invention contemplates multiple thresholds such that exceeding one threshold is indicative of a potential problem, exceeding a higher threshold could be indicative that the fault is such that the induction machine needs to be shut down for maintenance or repair. The condition monitoring process then concludes at 52.

In an alternate embodiment of the present invention, the induction machine, or motor, is modeled when known to be operating under normal healthy conditions. As such, comparison can be made between the determined instantaneous real and reactive power values to the modeled baseline values to determine the presence of load and internal motor faults as well as the extent of those faults relative to normal operation of that specific machine. Thresholds specific to an induction machine may then be established.

The frequency spectrum of the reactive power may include harmonics associated with load or motor-driven faults. That is, the frequency spectrum of reactive power is not exclusive to internal motor faults. The frequency spectrum of reactive power however is a better point of focus for determining fault information specific to the motor relative to the frequency spectrum of real power. Moreover, the present invention reducers the motor-driven fault information sufficiently to provide usable information regarding internal motor fault condition. One skilled in the art will appreciate that to acquire a frequency spectrum exclusive to the harmonics of the motor may require a decoupling of the load on the machine and/or additional mathematical computations, filters, or the like, to remove load fault information from the frequency spectrum of the reactive power.

Therefore, in accordance with one embodiment of the present invention, a method of identifying load and motor fault information in a condition monitoring system is provided. The method includes the step of simultaneously sampling voltage and current data of an induction machine in operation. An indicator of reactive power is then determined from a portion of the sampled voltage and current data. The method further includes the step of determining an internal motor fault using the indicator of reactive power.

In accordance with another embodiment of the present invention, an induction motor monitoring system includes at least one voltage sensor and at least one current sensor, as well as a controller connected to the at least one voltage and the at least one current sensors. The controller is configured to receive voltage and current data from the at least one voltage and at least one current sensor and determine instantaneous reactive power from the voltage and current data. The controller is further configured to generate a frequency spectrum for the instantaneous reactive power and determine a motor fault from at least the frequency spectrum.

In accordance with yet a further embodiment of the present invention, an apparatus to distinguish between a motor fault and a load fault in an AC induction motor is provided. The apparatus includes at least two current sensors for obtaining at least two AC motor current signals and at least two voltage sensors for obtaining at least two AC motor voltage signals. An analog-to-digital converter is provided for converting the at least two AC motor signals to digitized current signals, and the at least two AC motor voltage signals to digitized voltage signals. The apparatus further includes a microprocessor to receive the digitized signals and compare instantaneous reactive power values to a set of baseline reactive power values to determine a motor fault in the motor.

The present invention may be implemented either with hardware or software. As such, in another aspect of the invention, a computer readable storage medium having a computer program stored thereon to determine faults in an AC induction motor is provided. The computer program represents a set of instructions that when executed by a computer causes the computer to monitor operation of an AC motor having a load thereon and known to be operating normally. The computer is then caused to determine baseline operation from the modeling. The set of instructions further causes the computer to acquire real-time voltage and real-time current data of the AC motor in operation and determine reactive power of the AC motor from the real-time voltage and real-time current data. The computer is then caused to compare the reactive power to the baseline operation and determine therefrom the presence of fault conditions in the AC motor.

In accordance with another aspect of the present invention, a motor fault detector for an AC induction motor includes means for acquiring voltage and current data of an AC motor in operation. The detector further includes means for determining instantaneous reactive power from the AC motor from the voltage and current data. Means for determining an internal fault in the AC motor from the instantaneous reactive power is also provided.

The present invention has been described in terms of the preferred embodiment, and it is recognized that equivalents, alternatives, and modifications, aside from those expressly stated, are possible and within the scope of the appending claims.

What is claimed is:

1. A method of identifying load and motor fault information in a condition monitoring system comprising the steps of:
   simultaneously sampling voltage and current data of an induction machine in operation;
   determining an indicator of reactive power from a portion of the sampled voltage and current data; and
   determining an internal motor fault using the indicator of reactile power.

2. The method of claim 1 further comprising the steps of determining an indicator of real power from another portion of the sampled voltage and current data and determining a load fault from the indicator of real power.

3. The method of claim 2 further comprising the step of determining a frequency spectrum of real power and a frequency spectrum of reactive power.

4. The method of claim 3 further comprising the steps of analyzing the frequency spectrum of reactive power to determine a motor fault and analyzing the frequency spectrum of the indicator of real power to determine a load fault.

5. The method of claim 4 wherein the load fault includes a motor driven fault.

6. The method of claim 1 further comprising the steps of:
   determining two-phase voltages and two-phase current values from the sampled voltage and current data;
   determining a reference frame transformation angle from the two-phase voltage values; and
   transforming the two-phase current values and the two-phase voltage values to a rotating reference.

7. The method of claim 1 wherein the reactive power is an instantaneous reactive power.

8. An induction motor monitoring system comprising:
   at least one voltage sensor and at lease one current sensor; and
   a controller connected to the at least one voltage and the at least one current sensors and configured to:
      receive voltage and current data from the at least one voltage and the at least one current sensor;
      determine instantaneous reactive power from the voltage and current data;
      generate a frequency spectrum of the instantaneous reactive power; and
      determine a motor fault from at least the frequency spectrum.

9. The system of claim 8 wherein the at least one voltage sensor includes a pair of voltage sensor configured to acquire line-line voltages of two phases of an induction motor and wherein the at least one current sensor includes a pair of current sensors configured to acquire line-line currents of the two phases of the induction motor and wherein the controller is further configured to determine two-phase, voltage and two-phase current values from the voltage and current data.

10. The system of claim 9 wherein the controller is further configured to determine a reference frame transformation angle and apply a reference frame transform to transform the two-phase voltage and the two-phase current values to a rotating reference using the reference frame transformation angle.

11. The system of claim 10 wherein the controller is further configured to determine the instantaneous reactive power from the transformed two-phase voltage and the transformed two-phase current values.

12. The system of claim 11 wherein the controller is further configured to determine an instantaneous real power value from the transformed two-phase voltage and the transformed two-phase current values.

13. An apparatus to distinguish between a motor fault and a load fault in an AC induction motor, the apparatus comprising:
   at least two current sensors for obtaining at least two AC motor current signals;
   at least two voltage sensors for obtaining at least two AC motor voltage signals;
   an analog-to-digital converter for converting the at least two AC motor current signals to digitized current signals and the at least two AC motor voltage signals to digitized voltage signals; and
   a microprocessor to receive the digitized signals and compare instantaneous reactive power values to a set of baseline reactive power values to determine a motor fault in the motor.

14. The apparatus of claim 13 wherein the microprocessor computes a frequency spectrum of the instantaneous reactive power values and compares the frequency spectrum to a baseline reactive power frequency spectrum to determine the motor fault.

15. The apparatus of claim 13 wherein the microprocessor applies a reference frame transformation to the digitized signals prior to calculating the instantaneous reactive power values.

16. The apparatus of claim 13 wherein the processor calculates instantaneous real power values from the digitized signals and compares the instantaneous real power values to a set of baseline real power values to determine a motor-driven fault in the AC motor.

17. The apparatus of claim 16 wherein the processor computes a frequency spectrum of the instantaneous real power values and compares the frequency spectrum to a baseline real power frequency spectrum to determine the motor driven fault.

18. A computer readable storage medium having a computer program stored thereon to determine faults in an AC induction motor and representing a set of instructions that when executed by a computer causes the computer to:
   model operation of an AC motor having a load thereon and known to be operating normally and determine baseline operation therefrom;
   acquire real-time voltage and real-time current data of the AC motor in operation;
   determine reactive power of the AC motor from the real time voltage and real-time current data;
   compare the reactive power to the baseline operation; and
   determine presence of fault conditions in the AC motor from at least the comparison.

19. The computer readable storage medium of claim 18 wherein the set of instructions further causes the computer to issue a warning if a fault condition is found to be present in the AC motor.

20. The computer readable storage medium of claim 18 wherein the set of instructions further causes the computer to apply a reference frame transform to the real-time voltage and real-time current data.

21. The computer readable storage medium of claim 18 wherein the set of instructions further causes the computer to generate a frequency spectrum of the reactive power and display the frequency spectrum on a console for visual analysis by a user.

22. The computer readable storage medium of claim 21 wherein the set of instructions further causes the computer to display the frequency spectrum of the reactive power relative to a frequency spectrum of the baseline operation to visually indicate a fault condition in the AC motor.

23. A motor fault detector for an AC induction motor, the detector comprising:

means for acquiring voltage and current data of an AC motor in operation;

means for determining instantaneous reactive power in the AC motor from the voltage and current data; and means for determining an internal fault in the AC motor front the instantaneous reactive power.

* * * * *